US006431912B1

(12) United States Patent
Mori

(10) Patent No.: US 6,431,912 B1
(45) Date of Patent: Aug. 13, 2002

(54) WATERPROOF STRUCTURE FOR CONNECTOR

(75) Inventor: Shigeo Mori, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/713,252

(22) Filed: Nov. 16, 2000

(30) Foreign Application Priority Data

Nov. 16, 1999 (JP) ............................................ 11-325284

(51) Int. Cl.[7] ................................................ H01R 13/40
(52) U.S. Cl. ...................................... 439/587; 439/310
(58) Field of Search ................................ 439/274, 275, 439/587–589, 272, 310

(56) References Cited

U.S. PATENT DOCUMENTS

| | | | | |
|---|---|---|---|---|
| 5,266,045 A | | 11/1993 | Yamamoto et al. | ......... 439/275 |
| 5,364,285 A | * | 11/1994 | Sakurai | ...................... 439/275 |
| 5,618,198 A | * | 4/1997 | Sato | ............................ 439/274 |
| 5,820,395 A | * | 10/1998 | Hashizawa | .................. 439/272 |
| 5,984,706 A | * | 11/1999 | Kakuta et al. | .............. 439/310 |
| 5,993,253 A | * | 11/1999 | Sai | ............................. 439/578 |

FOREIGN PATENT DOCUMENTS

| | | |
|---|---|---|
| EP | 0 955 697 A1 | 11/1999 |
| GB | 2 151 416 A | 7/1985 |
| JP | 58-198874 | 11/1983 ........... H01R/13/52 |
| JP | 5-6784 | 1/1993 ........... H01R/13/52 |
| WO | 98/37609 | 8/1998 |

\* cited by examiner

*Primary Examiner*—P. Austin Bradley
*Assistant Examiner*—Larisa Tsukerman
(74) *Attorney, Agent, or Firm*—Sughrue Mion, PLLC

(57) ABSTRACT

A waterproof structure is provided for a connector wherein a terminal 3 to which a power line 4 is attached is retained in a connector housing 2 and a waterproof sealing member 9 is disposed between the connector housing 2 and the power line 4; wherein a front end 11 of the waterproof sealing member 9 is secured to the power line 4 and a rear end 12 of the waterproof sealing member 9 is secured to the connector housing 2; and wherein a stretch portion 14 is formed between the front end 11 and the rear end 12 of the waterproof sealing member 9. Reinforcement portions 19 and 20 are internally formed between the front end 11 and the rear end 12 of the waterproof sealing member 9. When the stretch portion 14 is extended, the front end 11 of the waterproof sealing member 9 abuts against a wall 24 of the connector housing 2, and the rear end 12 abuts against a rear holder 10 attached to the connector housing 2. This waterproof structure for a connector is applied for a power feed connector.

7 Claims, 6 Drawing Sheets

WATERPROOF STRUCTURE FOR CONNECTOR

BACKGROUND OF INVENTION

1. Field of Invention

The present invention relates to a power feed connector for an electric automobile, and relates in particular to a waterproof structure for a connector, including a waterproof sealing member that is closely attached to a power line that moves back and forth as the connector is engaged and disengaged.

2. Related art

FIGS. 6 and 7 are diagrams showing the waterproof structure of a conventional connector.

This structure is applied, for example, for a power feed connector for an electric automobile. As is shown in FIG. 6, a butt terminal 73 is slidably retained inside a synthetic resin connector housing 72 by the urging force exerted by a coil spring 74, and a power line 75, attached by a pressure connection to the terminal 73, is inserted into and slides through a hole 77 in a ring-shaped waterproof rubber plug (waterproof sealing member) 76.

The terminal 73, which has a substantially cylindrical shape and which is urged forward, i.e., in the connector engagement direction, by the coil spring 74, so that its distal end is held against a synthetic resin front holder 80 fitted over the distal end of the connector housing 72, forms an electrical connection with a terminal 79 of a connector 78 when its; distal end face abuts against the terminal 79. Ring-shaped waterproof packing 82, which is fitted around the distal end of a cylindrical, electrical contact portion 81 of the terminal 73, forms a seal with the inner wall of a terminal chamber 83.

A cylindrical press-fitting power line contact 84, which is integrally formed at the rear of the electric contact portion 81 of the terminal 73, is connected to the conductive portion of the terminal of the power line 75, which is closely attached to sealing lips around the inner diameter of the hole 77 in the rubber plug 76 through which it slides longitudinally. The rubber plug 76, which is formed using oil impregnation and which is positioned inside a hole 85 in the connector housing 72., is securely held in place by a synthetic rear holder 86, and sealing lips on its outer surface are closely attached to the inner fade of the hole 85. The connector housing 72, the waterproof rubber plug 76 and the holders 80 and 86 constitute a connector 71.

As does the connector 71, the other connector 78 includes at the least a synthetic resin connector housing 87 and a terminal 79. This terminal 79 also has an electric butt contact portion 88 having a substantially cylindrical shape and a press-fitting power line contact 89. The connector 78 itself is applied, for example, as a power reception connector mounted in an automobile.

As is shown in FIG. 7, when the connector 71 engages the connector 78, the terminal 73 is driven rearward to a retracted position by the terminal 79 and the coil spring 74 is compressed, while at the same time, the power line 75, which is moved to the rear and to a retracted position with the terminal 73, slides along the sealing lips on the inner diameter side of the hole 77 in the waterproof rubber plug 76. In this state, the distal end face of the terminal 73 is held tightly against the distal end of the terminal 79, forming an electrical connection between the power feed connector 71 and the power reception connector 78 and enabling the charging of the battery of an automobile to be begun.

When the charging is completed, the connector 71 is disengaged from the connector 78, disconnecting the terminal 73, which is driven forward by the urging force exerted by the coil spring 74, from the terminal 79, while at the same time, the power line 75, which is moved forward with the terminal 73, slides in contact with the sealing lips on the inner diameter side of the hole 77 in the waterproof rubber plug 76.

However, when the conventional structure is applied, especially as a power feed connector for an electric automobile, the connectors are frequently engaged and disengaged, so that the oil retained in the waterproof rubber plug (waterproof sealing member) 76, through which the power line 75 slides, is gradually consumed. Thus, as the friction is increased, there is a tendency for the abrasion or the cracking of the sealing lips on the inner diameter side of the hole 77 in the waterproof rubber plug 76 to occur. When this happens, water or dust may enter the connector 71 along the power line 75.

SUMMARY OF INVENTION

To resolve this problem, it is one objective of the present invention to provide for a connector a waterproof structure that can prevent the abrasion of the waterproof sealing member of the connector, along which a power line slides as connectors are engaged and disengaged, and that can enhance the waterproof and dustproof properties of the connector.

To achieve the above objective, in accordance with the invention, a waterproof structure is provided for a connector wherein a terminal to which a power line is attached is retained in a connector housing and a waterproof sealing member is disposed between the connector housing and the power line; wherein the front of the waterproof sealing member is secured to the power line and the rear of the waterproof sealing member is secured to the connector housing; and wherein a stretch portion is formed between the front and the rear of the waterproof sealing member.

It is also effective for a reinforcement portion to be internally formed between the front and the rear of the waterproof sealing member.

Further, it is effective, when the stretch portion is extended, for the front of the waterproof sealing member to abut against the wall of the connector housing, and for the;rear to abut against a rear holder attached to the connector housing.

In addition, it is effective for the waterproof structure for a connector of the present invention to be applied for a power feed connector.

DETAILED DESCRIPTION OF PREFERRED EMBODIMENTS

The preferred embodiment of the invention will now be described in detail while referring to the accompanying drawings.

Figure 1:
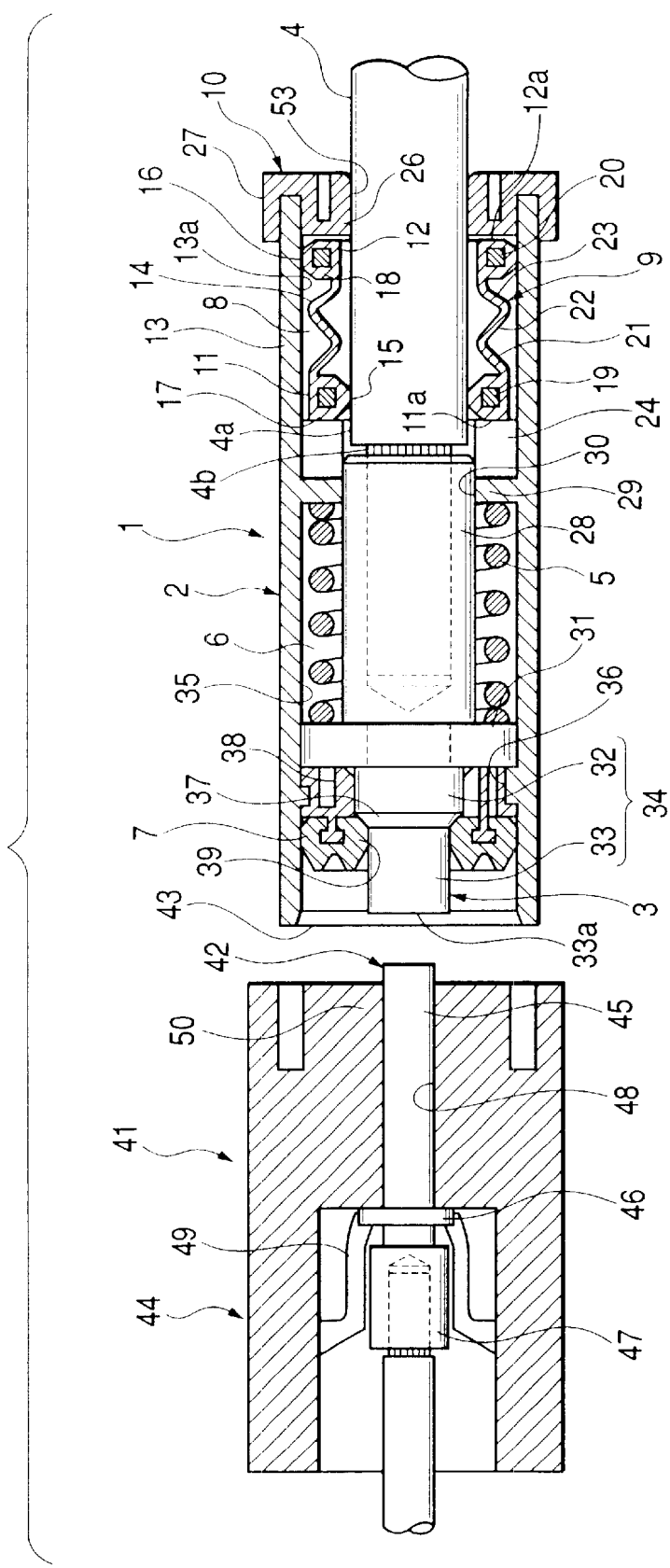
FIG. 1 is a vertical cross-sectional view of a waterproof structure for a connector according to one embodiment of the invention.
Figure 2:
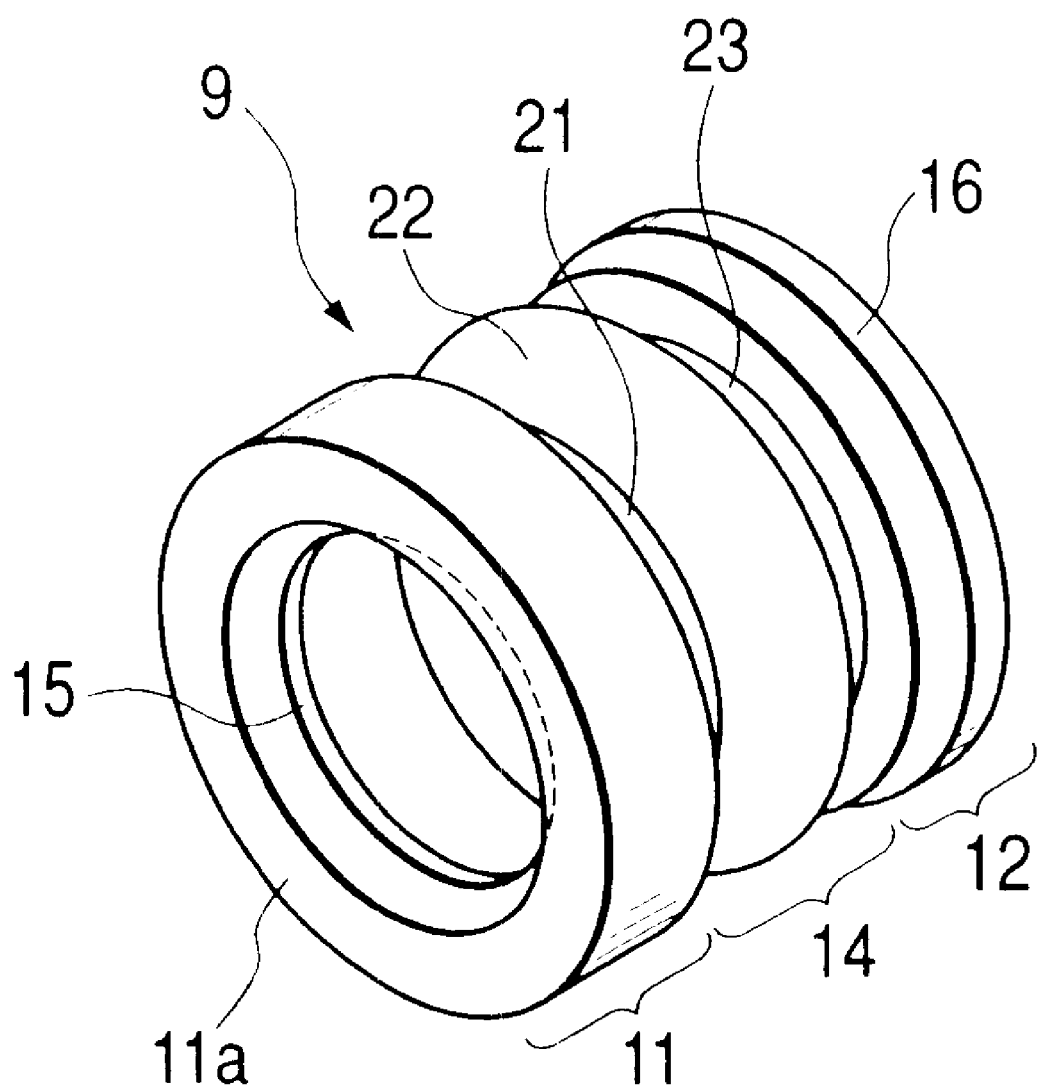
FIG. 2 is a perspective view of a waterproof sealing member used for the waterproof structure for a connector.
Figure 3:
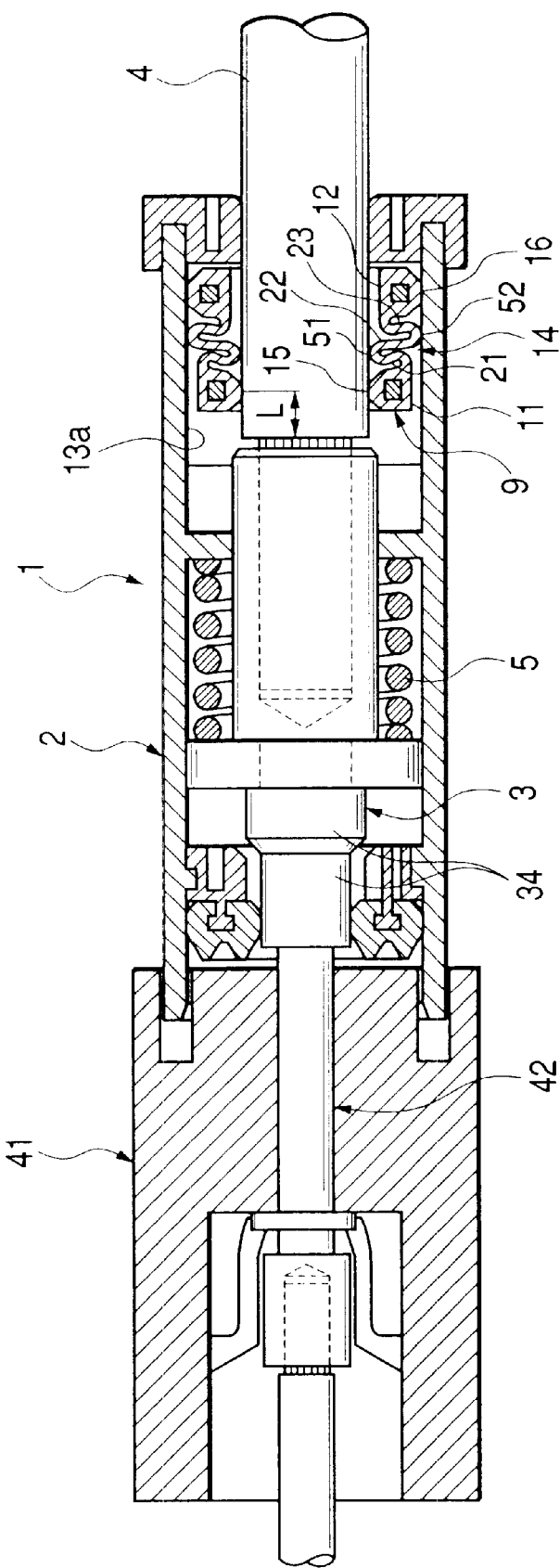
FIG. 3 is a vertical cross-sectional view of the waterproof structure for a connector when two connectors are engaged.

FIGS. 1 to 3 are diagrams showing a waterproof structure for a connector according to the embodiment of the invention.

As is shown in FIG. 1, a connector 1 comprises: a synthetic resin connector housing 2; a butt contact terminal 3, which is loaded into and slides within the connector housing 2; a power line 4, which is secure to the terminal 3; a coil spring 5, which urges the terminal 3 forward (in the connector engagement direction); waterproof rubber packing 7, which contacts the terminal 3 at the front of a terminal chamber 6 that is defined in the front portion of the connector housing 2; a waterproof rubber sealing member 9 having a ring and bellows shape, which is mounted inside a power line chamber 8 defined in the rear portion of the connector housing 2; and a rear holder 10, which holds the waterproof sealing member 9 at the rear of the connector housing 2.

The feature of the waterproof structure for the connector in this embodiment is that the front 11 of the waterproof sealing member 9, which has a bellows shape, is secured to the outer face of the power line 4, and that the rear 12 of the waterproof sealing member 9 is secured to an inner wall 13a of the power line chamber 8 in the connector housing 2.

The outer diameter of the front 11 of the waterproof sealing member 9 and the outer diameter of a bellows portion (a stretch portion) 14 in the middle of the waterproof sealing member 9 are formed slightly smaller than the inner diameter of the inner wall 13a of the power line chamber 8. Further, the inner diameter of the rear 12 of the waterproof sealing member 9 is slightly larger than the outer diameter of an insulation sleeve 4a for the power line 4. The front 11 and the bellows portion 14 of the waterproof sealing member 9 do not contact the inner wall 13a of the power line chamber 8, and the rear 12 of the waterproof sealing member 9 does not contact the outer face of the insulation sleeve 4a for the power line 4.

The front 11 of the waterproof sealing member 9 has an inward extended sealing lip 15 having a substantially triangular shape in cross section, and the rear 12 of the waterproof sealing member 9 has an outward extended sealing lip 16 having a substantially triangular shape in cross section. The inward extended sealing lip 15 closely contacts the outer face of the power line 4, and the outward extended sealing lip 16 closely contacts the inner wall 13a of the power line chamber 8.

The front 11 and the rear 12 of the waterproof sealing member 9 respectively have ring-shaped thick portions 17 and 18, which in cross section have substantially rectangle shapes, that are integrally formed with the sealing lips 15 and 16. Ring-shaped, rigid reinforcement members 19 and 20, composed of metal or synthetic resin, are respectively embedded in the thick portions 17 and 18.

The front 11 of the waterproof sealing member 9 is held securely against the outer face of the power line 4 by the front reinforcement member 19, and the rear 12 of the waterproof sealing member 9 is held securely against the wall 13 of the connector housing 2 by the rear reinforcement member 20, so that the position of the sealing member 9 is not shifted in the axial direction and in the circumferential direction. At the same time, the sealing lip 15 of the front 11 closely contacts the outer face of the power line 4, and the sealing lip 20 of the rear 12 closely contacts the inner wall 13a of the connector housing 2. The tension with which the sealing lips 15 and 16 respectively contact the power line 4 and the wall 13 of the connector housing 2 is increased by the reinforcement members 19 and 20.

As is shown in FIG. 2, the front 11 of the waterproof sealing member 9 is coupled with the rear 12 by the bellows portion 14. The bellows portion 14 is formed by a first inwardly inclined portion 21, extending inward from the front 11, a second outwardly inclined portion 22, extending outward from the first inclined portion 21, and a third inwardly inclined portion 23, extending inward from the second inclined portion 22 to the rear 12. The first inclined portion 21 and the third inclined portion 23 have substantially the same length and the same inclination angle, while the second inclined portion 22 is slightly larger and a slightly greater inclination angle.

In the state in FIG. 1 wherein the connector 1 has not yet engaged, the waterproof sealing member 9 is extended while the bellows portion 14 is substantially in the free state. A front face 11a of the front 11 is held against a projected wall (wall portion) 24 in the connector housing 2, while a rear face 12a of the rear 12 is held against the rear holder 10. A plurality of projected walls 24 may be formed at like intervals around the inner circumference of the power line chamber 8, or a single, continuous projected wall 24 having a ring shape may be formed.

The projected wall 24 is used to position the front 11 of the waterproof sealing member 9, and to prevent the excessive stretching of the bellows portion 14. That is, while the terminal 3, which is connected to the power line 4, is retained in the terminal chamber 6, and the waterproof sealing member 9 is loaded, along the power line 4, into the power line chamber 8, the front 11 of the waterproof sealing member 9 abuts against the projected wall 24, and remains positioned there. Then, the rear 12 of the waterproof sealing member 9 is positioned by fitting the rear holder 10 over the connector housing 2. Together, the projected wall 24 and the rear holder 10 determine the overall, appropriate length of the waterproof sealing member 9.

The rear holder 10 is composed of synthetic resin, and includes a ring-shaped projection 26, which is to be inserted into the power line chamber 8 defined in the rear portion of the connector housing 2, and a hole 53 through which the power line 4 is inserted. The rear 12 of the waterproof sealing member 9 contacts the projection 26, and is fixed in place by, for example, fitting the wall 27 on the outer face of the rear holder 10 around the wall 13 of the connector housing 2. Example engagement means are a protrusion (not shown) formed on the connector housing 2 and a corresponding engagement hole (not shown) formed in the rear holder 10.

The insulation sleeve 4a of the power line 4 projects forward past the front 11 of the waterproof sealing member 9, and a conductive portion 4b projects forward from the front of the insulation sleeve and is inserted into the cylindrical press-fitting power line contact 28. As a result, the power line 4 is connected to the waterproof sealing member 9,. and the front 11 of the waterproof sealing member 9 is located nearer the front of the insulating sleeve 4a. Since, as is shown in FIG. 3, the power line 4 and the front 11 of the waterproof sealing member move together when the connectors are engaged, the length L of the power line 4 that projects forward from the front 11 is small, and longitudinally, the length of the connector 1 can be reduced.

In FIG. 1, the rear of the press-fitting power line contact 28 of the terminal 3 is inserted into a hole 30 that is defined by a partition wall 29 formed between the terminal chamber 6 and the power line chamber 8 of the connector housing 2. The front of the press-fitting power line contact 28 continues forward to a flange 31, and a cylindrical contact protrusion 34 is formed on the front of the flange 31. The front of the flange 31 abuts against a protruding stopper 36, which extends inward from an inner wall 35 of the terminal chamber 6 and which controls the positioning of the terminal 3. For the assembly process, it is preferable that a notch be formed in the flange 31 into which the protruding stopper 36 can be inserted, while the outer face of the flange 31 contacts the inner wall 35 of the terminal chamber 6. The coil spring 5 is located between the flange 31 and the partition wall 29.

The contact protrusion 34 of the terminal 3 has a step portion 37 in its middle in the axial direction. A large-diameter portion 32, which constitutes the rear half of the protrusion 34, contacts a ring-shaped guide 38 of the waterproof packing 7, and a small-diameter portion 33 and the step portion 37, which constitute the front half of the protrusion 34, contact a sealing lip 39 on the inner diameter side of the waterproof packing 7. A front face 33a of the small-diameter portion 33 is flat, and serves as the face whereat contact is made with a terminal 42 of a connector 41. The contact face 33a is positioned slightly inward from the front of the connector housing 2.

As an example method for assembling :the connector 1, the terminal 3, to which the power line 4 is attached in advance, is loaded into the connector housing 2 through a front opening 43 in the connector housing 2, while the power line 4 is fed to the rear through the coil spring 5, which is loaded in advance, and the hole 30 defined by the partition wall 29. The protruding stopper 36 is inserted into the notch in the flange 31 of the terminal 3, and the terminal 3 is pressed in against the force exerted by the coil spring 5 until it can be turned in the circumferential direction, thereby shifting the notch in the flange 31 and the protruding stopper 36 away from each other so that the terminal 3 is prevented from slipping out. The waterproof packing 7 is then inserted through the front opening 43.

With the flange 31 abutting against the protruding stopper 36, the waterproof sealing member 9 is inserted through the rear opening in the power line chamber 8. The waterproof sealing member 9, which is first fed over the power line 4, is compressed in the longitudinal direction, and the front 1 is pushed until it contacts the projected wall 24. Finally, the rear holder 10 is fitted around the connector housing 2, while the projection 26 is inserted into the rear opening in the power line chamber 8, thereby determining the overall length of the waterproof sealing member 9.

The other connector 41 includes a synthetic resin connector housing 44, and the butt contact terminal 42 that is held in the connector housing 44. The terminal 42 has a long cylindrical contact portion 45 in the front, a collar 46 in the middle and a press-fitting power line contact 47 at the rear. The contact portion 45 is inserted into a hole 48 in the connector housing 44, its distal end projecting slightly, while the collar 46 is held by a flexible lance 49. A boss 50 is formed on the front of the connector housing 44, so that when it is moved forward it can enter the front opening 43 of the connector housing 2.

As is shown in FIG. 3, at the same time the connectors 1 and 41 are engaged, the distal ends of the terminals 3 and 42 contact each other. The terminal 3, driven by the terminal 42, moves (slides) rearward against the urging force exerted by the coil spring 5. At this time, the power line 3 is moved to the rear with the terminal 3; however, since the front 11 of he waterproof member 9 is securely attached to the power line 4 by a strong tension, the front 11 moves with the power line 4, and the bellows portion 14 is compressed and absorbs the distance travelled by the power line 4. The rear 12 of the waterproof sealing member 9 does not move, and remains closely attached to the inner wall 13a of the connector housing 2.

Since, unlike in the conventional case, the front 11 of the waterproof sealing member 9 does not slide across the surface of the power line 4, there is no abrasion of the sealing lip 15 of the front 11, and the waterproof and dustproof sealing properties can be stably maintained for an extended period of time. Further, since the rear 12 of the waterproof sealing member 9 does not slide across the surface of the inner face 13a of the connector housing 2, there is also no abrasion of the sealing lip 16 of the rear 12, and the waterproof and dustproof properties can be stably maintained for an extended period of time.

When the bellows portion 14 is compressed, an inward extending crest 51, which is formed between the short, first inclined portion 21 and the long, second inclined portion 22, contacts the outer face of the power line 4, while an outward extending crest 52, which is formed between the long, second inclined portion 22 and the short, third inclined portion 23, contacts the inner wall 13a of the connector housing 2. As a result, the waterproof and dustproof properties are increased when the connectors are engaged. Meanwhile, the coil spring 5, which is not fully compressed, applies sufficient force to the contact protrusion 34 of the terminal 3 to drive it against the terminal 42 and provide a good connection.

When the connector 1 is disengaged from the other connector 41, the urging force produced by the coil spring 5 returns the terminal 3 to the original position shown in FIG. 1. At the same time, as the power line 4 is moved forward with the terminal 3, the front 11 of the waterproof sealing member 9 moves with the power line 4, so that the bellows portion 14 is extended as is shown in FIG. 1. However, the position of the rear 12 of the waterproof sealing member 9 is unchanged.

The bellows portion (a stretch portion) 14 of the waterproof sealing member 9 may be replaced with a cylindrical thin wall portion (a stretch portion) (not shown), which is as long as the bellows portion 14 in FIG. 1, or with a stretch portion that can substantially be bent into an S shape extending along the diameter of the power line 4 (the bellows portion 14 in FIG. 1 is substantially bent in an S shape extending along the axial direction of the power line 4).

Figure 4:
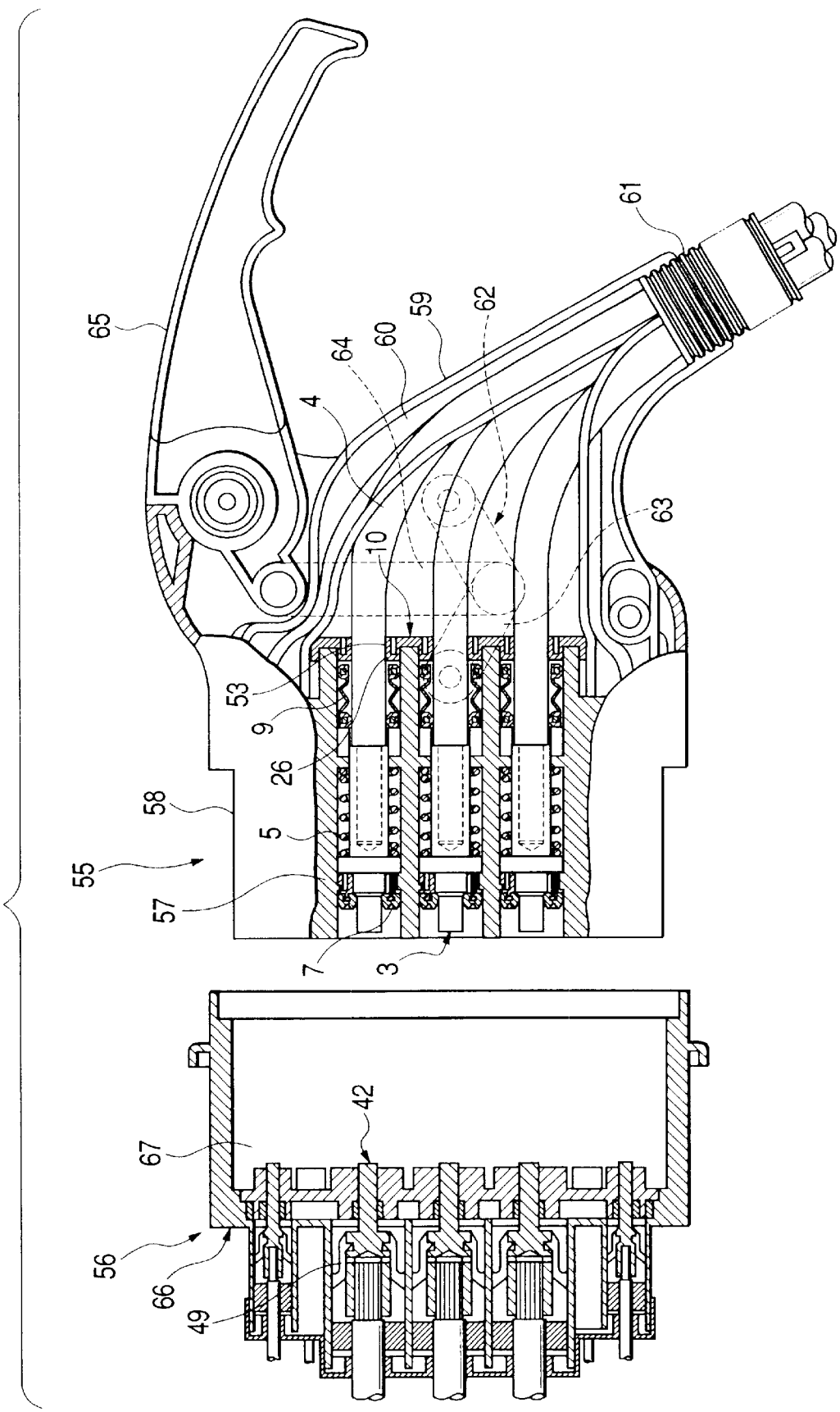
FIG. 4 is a vertical cross-sectional view of an example application for the waterproof structure for a connector according to the invention.
Figure 5:
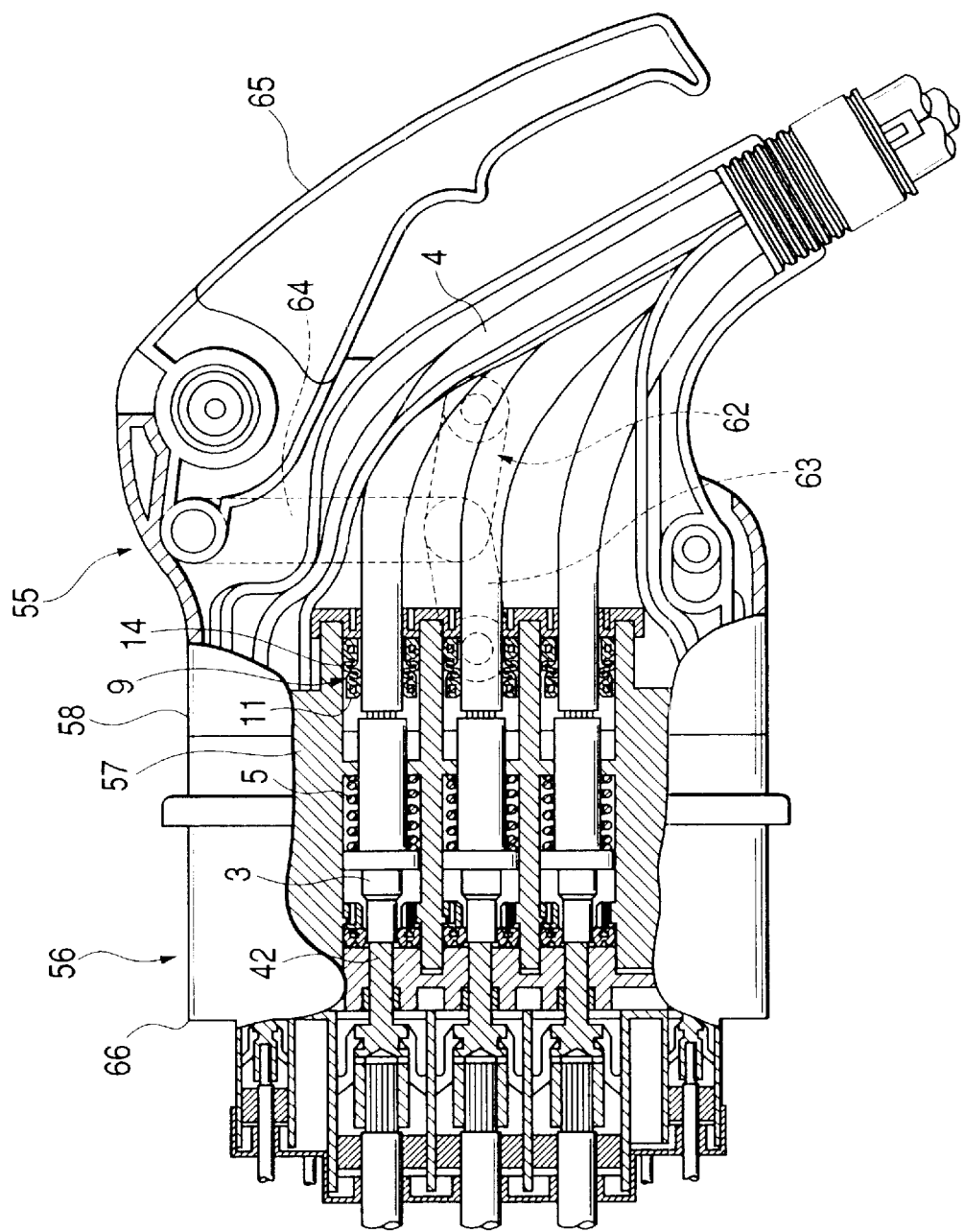
FIG. 5 is a vertical cross-sectional view of the waterproof structure when the connectors are engaged.
Figure 6:
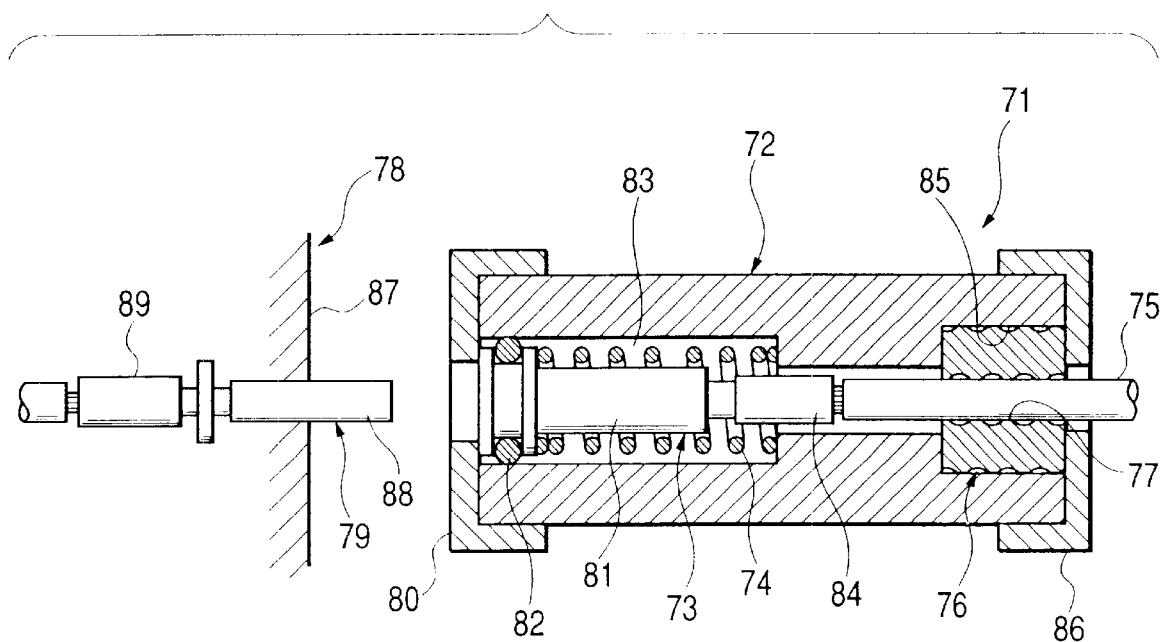
FIG. 6 is a vertical cross-sectional view of a conventional waterproof structure for a connector.
Figure 7:
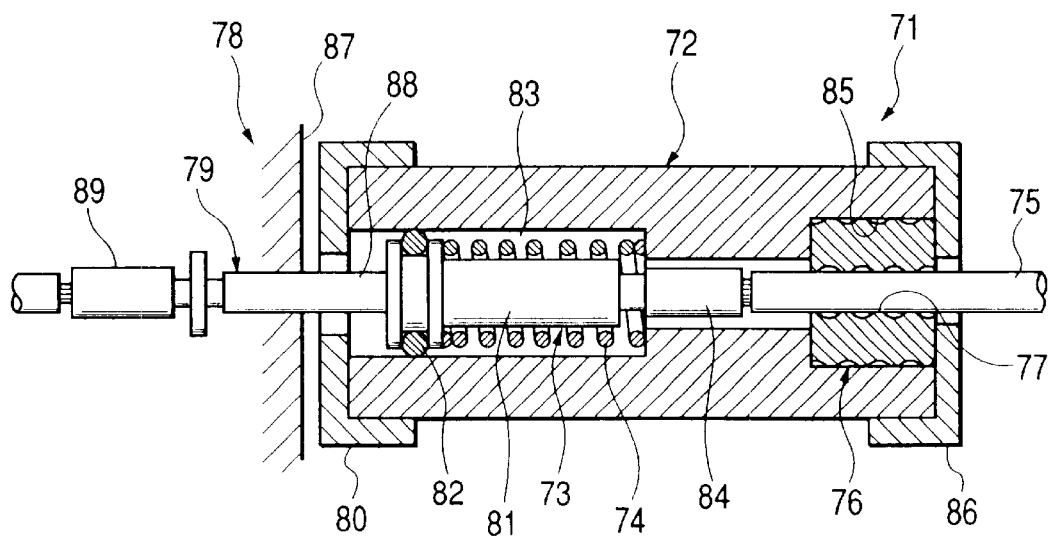
FIG. 7 is a vertical cross-sectional view of the conventional waterproof structure when the connectors are engaged.

FIGS. 4 and 5 are diagrams showing, as an example application of the above described waterproof structure for the connector, a power feed connector 55 that is used to charge the battery of an automobile (including a hybrid car), and a power receiving connector 56 that is installed in an automobile. The same reference numerals as are used in the above embodiment are used to denote corresponding components, and no detailed explanation for them will be given.

As is shown in FIG. 4, in the power feed connector 55, a plurality of sets of butt contact terminals 3, waterproof packings 7, coil springs 5 and bellows-shaped waterproof sealing members 9 are radially arranged at the same pitches.

A rear holder 10 is formed as a single disc, and includes insertion holes 53 for individual power lines 4 and projections 26 relative to the individual waterproof sealing members 9. The power lines 4, which are attached to the terminals 3 are introduced into a protection tube 61 through a space 60 inside a handle 59 at the rear of a synthetic resin case 58. The power lines 4 can be moved back and forth while their shapes are distorted in the space 60.

A connector housing 2, mounted inside the synthetic resin case 58 so that it can slide forward and rearward, is connected to one end of a sub-link pair 63 of a toggle 62, which is a drive mechanism. A main link 64 of the toggle 2 is connected to an operation lever 65, which is pivoted at the case 58. The toggle 62 is an example drive mechanism, and another drive mechanism (not shown) may be employed.

A power receiving connector 56, installed in an automobile, is so designed that a plurality of butt terminals 42 are arranged inside a connector housing 66 in consonance with the corresponding terminals 3. The connector housing 66 includes a connector engagement chamber 67 in its front portion, and the distal end faces of the terminals 42 project slightly into the connector engagement chamber 67. The terminals 42 are held in the connector engagement chamber 67 by flexible lances 49.

Under the conditions shown in FIG. 4, the power feed connector 55 is inserted into and engages the power receiving connector 56. When the operation lever 65 of the power feed connector 55 is pushed down, the connector housing 57 is moved forward in the case 58, and as is shown in FIG. 5, the front faces of the terminals 3 are brought into contact with the front faces of the terminals 42 by the urging force exerted by the coil springs 5. At this time, the terminals 3 and the power lines 4 are moved rearward together, while the fronts 11 of the waterproof sealing members 9 move to the rear with the power lines 4, compressing the bellows portions 14. Locking means (not shown) that is provided is used for the engagement of the case 58 of the power feed connector 55 with the front half of the connector housing 66 of the power receiving connector 56. At this time, the connector housing 57 of the power feed connector 55 is locked in the case 58 by the inverse upward rotation of the sub-link pair 63 of the toggle 62.

When the charging is completed, the locking means (not shown) releases the power feed connector 55 from the power receiving connector 56. At this time, the terminals 3 are moved forward (returned) by the urging force exerted by the coil springs 5, and accordingly, the power lines 4 are pulled back. At the same time, the fronts 11 of the waterproof sealing member 9 move forward with the power lines 4, and the bellows portions 14 are extended and returned to the original state shown in FIG. 4.

As is described above, according to the first aspect of the invention, when the power line is retracted when the connectors are engaged, the rear of the waterproof sealing member is securely held and is not moved. The front of the waterproof sealing member, however, is moved to the rear with the power line, and the stretch portion of the waterproof sealing member is compressed. Therefore, unlike in the conventional case the waterproof sealing member does not slide along the power line, so that abrasion of the waterproof sealing member is prevented, and the waterproof and dustproof properties are enhanced.

According to the second aspect of the invention, the rigidity of the front and the rear of the waterproof sealing member is increased by the reinforcement member, and the tension applied by the front, relative to the power line, and the pressing force of the rear, relative to the connector housing, are increased. Therefore, the front is closely attached to and securely held against the power line, and the rear is closely attached to and securely held against the connector housing. As a result, the waterproof sealing member can be prevented from sliding in consonance with the forward and rearward movement of the power line, and abrasion of the waterproof sealing member by the power line and the connector housing can be prevented. Thus, the effects of the first aspect are demonstrated. At the same time, the sealing of the front of the waterproof sealing member to the power line and the sealing of it to the rear of the connector housing are improved, and the waterproof and dustproof properties are enhanced.

According to the third aspect of the invention, the appropriate overall length of the waterproof sealing member is determined by the wall of the connector housing and the rear holder. Thus, excessive stretching and compression of the stretch portion can be prevented, and the service life of the waterproof sealing member can be extended. Further, when the rear holder is fitted over the connector housing, the rear of the waterproof sealing member is pushed so as to automatically adjust the overall length of the waterproof sealing member. Therefore, the waterproof sealing member can be easily and precisely assembled.

According to the fourth aspect of the invention, when the waterproof structure for the connector is applied for a power feed connector for charging an electric automobile, the waterproof sealing member does not slide along the power line or inside the connector housing, even when the forward and rearward movement of the power line, which occurs each time the power feed connector is used for charging, is repeatedly performed. Thus, the waterproof sealing member is not abraded, and the waterproof and dustproof properties of the power feed connector are improved.

What is claimed is:

1. A waterproof structure for a connector comprising:
   a connector housing having a power line chamber therein;
   a terminal to which a power line is attached so that the terminal and power line are retained in said connector housing;
   a waterproof sealing member disposed between said power line chamber and said power line, said waterproof sealing member including a front portion, a rear portion and a stretch portion interconnecting the front and rear portions, the front portion of said waterproof sealing member being secured to said power line and configured so as to not contact an inner wall of said power line chamber, the rear portion of said waterproof sealing member being secured to said inner wall of said power line chamber; and
   wherein said stretch portion is more flexible than said front and said rear portions of said waterproof sealing member so as to be operative to permit said front portion to be drawn towards and away from said rear portion.

2. A waterproof structure according to claim 1, further comprising: a reinforcement portion internally formed between said front portion and said rear portion of said waterproof sealing member.

3. A waterproof structure according to claim 1 or 2, wherein, when said stretch portion is extended, said rear portion of said waterproof sealing member abuts against a rear holder attached to said connector housing.

4. A waterproof structure according to claim 1, wherein said front portion of said waterproof sealing member has an inwardly extending sealing lip, and wherein said rear portion of said waterproof sealing member has an outwardly extending lip.

5. A waterproof structure according to claim 1, wherein said rear portion of said waterproof sealing member is secured to said connector housing so as not to contact an outer face of said power line.

6. A waterproof structure according to claim 1, wherein said stretch portion has an accordion-like shape.

7. A power feed connector comprising:
- a connector housing having a power line chamber therein;
- a terminal to which a power line is attached so that the terminal and power line are retained in said connector housing;
- a waterproof sealing member disposed between said power line chamber and said power line, said waterproof sealing member including a front portion, a rear portion and a stretch portion interconnecting the front and rear portions, the front portion of said water-proof sealing member being secured to said power line and configured so as to not contact an inner wall of said power line chamber, the rear portion of said waterproof sealing member being secured to said inner wall of said power line chamber; and
- wherein said stretch portion is more flexible than said front and said rear portions of said waterproof sealing member so as to be operative to permit said front portion to be drawn towards and away from said rear portion.

* * * * *